US012399615B2

(12) United States Patent
Peng

(10) Patent No.: US 12,399,615 B2
(45) Date of Patent: Aug. 26, 2025

(54) VIRTUALIZED PHYSICAL CONTROLLER

(71) Applicant: Bungie, Inc., Bellevue, WA (US)

(72) Inventor: Gregory Peng, Bellevue, WA (US)

(73) Assignee: BUNGIE, INC., Bellevue, WA (US)

( * ) Notice: Subject to any disclaimer, the term of this patent is extended or adjusted under 35 U.S.C. 154(b) by 49 days.

(21) Appl. No.: 18/281,276

(22) PCT Filed: Mar. 8, 2022

(86) PCT No.: PCT/US2022/019240
§ 371 (c)(1),
(2) Date: Sep. 8, 2023

(87) PCT Pub. No.: WO2022/192178
PCT Pub. Date: Sep. 15, 2022

(65) Prior Publication Data
US 2024/0176483 A1 May 30, 2024

Related U.S. Application Data

(60) Provisional application No. 63/158,951, filed on Mar. 10, 2021.

(51) Int. Cl.
G06F 3/04886 (2022.01)
A63F 13/2145 (2014.01)
(Continued)

(52) U.S. Cl.
CPC ...... *G06F 3/04886* (2013.01); *A63F 13/2145* (2014.09); *A63F 13/22* (2014.09);
(Continued)

(58) Field of Classification Search
CPC .. G06F 3/04886; G06F 3/0488; G06F 3/0486; G06F 2203/04808; A63F 13/2145;
(Continued)

(56) References Cited

U.S. PATENT DOCUMENTS 10,528,247 B2 *  1/2020  Abe ............... G06F 3/0482
2011/0285636 A1 * 11/2011  Howard ......... G06F 3/04883
345/173
(Continued)

FOREIGN PATENT DOCUMENTS

AE  P6002243/2023  9/2023
AU  2022232901    9/2023
(Continued)

OTHER PUBLICATIONS

Australian Application No. 2022232901, Third Examination Report dated Aug. 19, 2024.
(Continued)

*Primary Examiner* — Daniel Samwel
(74) *Attorney, Agent, or Firm* — Kilpatrick Townsend & Stockton LLP

(57) ABSTRACT

Described herein are techniques for implementing a virtualized physical controller. The techniques may include receiving user input(s) on a touchscreen display of a user device, including a first touch from which can define a primary input region and one or more secondary touches offset from the first which can define or more secondary input regions arranged adjacent to the primary input region. The input regions are associated with respective input mechanisms or commands in the configuration data. While the configuration data is implemented, the touchscreen display can monitor for touches, detect touch input in the configured regions, and generate activation data for each input mechanism or command in response to touch. The positions and shapes of the input regions may be iteratively redefined as touch input is monitored on the touchscreen display.

20 Claims, 10 Drawing Sheets

(51) Int. Cl.
*A63F 13/22* (2014.01)
*A63F 13/285* (2014.01)
*A63F 13/42* (2014.01)
*A63F 13/77* (2014.01)
*A63F 13/79* (2014.01)
*G06F 3/0486* (2013.01)

(52) U.S. Cl.
CPC ............ *A63F 13/77* (2014.09); *G06F 3/0486* (2013.01); *A63F 13/285* (2014.09); *A63F 13/42* (2014.09); *A63F 13/79* (2014.09); *A63F 2300/6045* (2013.01); *G06F 2203/04808* (2013.01)

(58) Field of Classification Search
CPC .......... A63F 13/22; A63F 13/42; A63F 13/77; A63F 13/285; A63F 13/79; A63F 2300/6045; A63F 2300/1075; A63F 2300/1018; A63F 2300/301; A63F 2300/403
See application file for complete search history.

(56) References Cited

U.S. PATENT DOCUMENTS

| | | | |
|---|---|---|---|
| 2012/0146912 | A1 | 6/2012 | Chen et al. |
| 2015/0072784 | A1 | 3/2015 | Lee |
| 2015/0182856 | A1* | 7/2015 | Mays, III ............... G06F 3/0488 463/31 |
| 2016/0328069 | A1* | 11/2016 | Berkes ................ G06F 3/04166 |
| 2017/0340959 | A1 | 11/2017 | Tang et al. |
| 2018/0260104 | A1* | 9/2018 | Hanada ................ G06F 3/04817 |
| 2019/0134499 | A1 | 5/2019 | Lee |
| 2020/0086214 | A1 | 3/2020 | Kabuki et al. |

FOREIGN PATENT DOCUMENTS

| | | |
|---|---|---|
| CA | 3213026 | 9/2023 |
| CN | 102609185 | 11/2015 |
| CN | 202280019772.2 | 9/2023 |
| CN | 117015757 | 11/2023 |
| EP | 22767750.7 | 9/2023 |
| EP | 4291974 | 12/2023 |
| IL | 305748 | 9/2023 |
| JP | 2012-063852 | 3/2012 |
| JP | 2012-128832 | 7/2012 |
| JP | 2012-168932 | 9/2012 |
| JP | 2013-223044 | 10/2013 |
| JP | 2014-506364 | 3/2014 |
| JP | 2014-531946 | 12/2014 |
| JP | 2015-150417 | 8/2015 |
| JP | 2018-143785 | 9/2018 |
| JP | 2020-157039 | 10/2020 |
| JP | 2023-554301 | 9/2023 |
| JP | 2024509871 | 3/2024 |
| KR | 1020100098972 A | 9/2010 |
| KR | 101216307 B1 | 12/2012 |
| KR | 1020210023924 A | 3/2021 |
| MX | MX/a/2023/010551 | 9/2023 |
| NZ | 803789 | 9/1823 |
| RU | 2023125037 | 9/2023 |
| SA | 523450613 | 9/2023 |
| WO | PCT/US2022/019240 | 3/2022 |
| WO | WO 2022/192178 | 9/2022 |

OTHER PUBLICATIONS

Japanese Application No. 2023-554301, Non-Final Notification of Reasons for Refusal dated Sep. 24, 2024.
Australian Application No. 2022232901, Second Examination Report dated Jun. 17, 2024.
European Application No. 22767750.7, Extended European Search Report dated Jul. 12, 2024.
Canadian Application No. 3,213,026, First Examiner's Report dated Nov. 14, 2024.
International Patent Application No. PCT/US2022/019240, International Search Report and Written Opinion mailed Jun. 15, 2022, 9 pages.
PCT Application No. PCT/US2022/019240, International Preliminary Report on Patentability dated Sep. 12, 2023.
Australian Application No. 2022232901, First Examination Report dated Jan. 18, 2024.
UAE Application No. P6002243/2023, Examination Report and Search Report dated Dec. 13, 2024.

* cited by examiner

VIRTUALIZED PHYSICAL CONTROLLER

BACKGROUND

Modern computer controller systems, such as those used by computer and video games, as well as by general-use operating systems, employ a variety of techniques to direct the movement of objects displayed on-screen. Known techniques include the use of an external control device such as a mouse, directional nub, touchpad, pen, game controller, or joystick to create either a directional vector or to designate a position for moving an on-screen object, such as a pointer or reticule, or to cause movement of a user's viewpoint.

Some techniques can employ an additional layer of sophistication by measuring the speed of movement of the external device to enhance movement of the on-screen object by changing the behavior of the on-screen object in response to a parameter of the input (e.g., acceleration of a pointer based on the speed at which an external device is moved). Touch-enabled devices can also be configured to accept inputs in ways that simulate the behavior of external control devices. However, control schemes for touch-enabled devices tend to fall short of the tactile feel and responsiveness that have been achieved in physical controllers, and further development in this field is warranted.

Some touch-enabled control schemes are presented in extant games, however, for many users the transition from playing a game on a physical video game controller to playing one on a flat screen device with physical buttons is unsatisfying. Users can quickly learn how to provide input to well-designed physical controllers without needing to look at their hands to see what buttons they are pressing.

Physical controllers are optimized for a "resting" hand and thumb position that makes it easy to trigger adjacent buttons from muscle memory without looking and have a tactile feel that makes it easy to determine where the controls are, and which inputs have been used. In the absence of mechanical controls, improvements in touch-enabled control schemes are needed.

SUMMARY

Techniques are provided herein for implementing a virtualized physical controller. In other words, a controller that replicates, using software, what is typically performed using a physical hardware controller. The virtualized physical controller may be implemented via a number of buttons displayed on a touchscreen display of a user device (such as a mobile phone).

In one embodiment, a method is disclosed as being performed by a user device, the method comprising receiving, from a user, input indicating one or more positions on a touchscreen display to be associated with one or more input mechanisms, storing, in a configuration data, an association between one or more regions corresponding to the one or more positions on the touchscreen display and a respective input mechanism of the one or more input mechanisms, determining that the configuration data is to be implemented, and upon determining that the configuration data is to be implemented, implementing the configuration data by: monitoring touch input on the touchscreen display, detecting touch input within the one or more regions, and generating activation data for each respective input mechanism of the one or more input mechanisms.

An embodiment is directed to a computing system comprising a processor; and a memory including instructions that, when executed with the processor, cause the computing device to, at least receive, from a user of the controller computing device, input indicating one or more positions on a touchscreen display to be associated with one or more input mechanisms, store, in a configuration data, an association between one or more regions corresponding to the one or more positions on the touchscreen display and a respective input mechanism of the one or more input mechanisms, determine that the configuration data is to be implemented, and upon determining that the configuration data is to be implemented, implement the configuration data by: monitoring touch input on the touchscreen display, detecting touch input within the one or more regions, and generating activation data for each respective input mechanism of the one or more input mechanisms.

An embodiment is directed to a non-transitory computer-readable media collectively storing computer-executable instructions that upon execution cause one or more computing devices to collectively perform acts comprising receiving, from a user, input indicating one or more positions on a touchscreen display to be associated with one or more input mechanisms, storing, in a configuration data, an association between one or more regions corresponding to the one or more positions on the touchscreen display and a respective input mechanism of the one or more input mechanisms, determining that the configuration data is to be implemented, and upon determining that the configuration data is to be implemented, implementing the configuration data by: monitoring touch input on the touchscreen display, detecting touch input within the one or more regions, and generating activation data for each respective input mechanism of the one or more input mechanisms.

An embodiment is directed to receiving user input(s) on a touchscreen display of a user device to be associated with input mechanisms or commands, including a first touch from which can be defined a primary input region and one or more secondary touches offset from the first. In a configuration data, one or more secondary input regions arranged adjacent to or radially about the primary input region are defined based at least in part on relative positions of the one or more secondary touches with respect to the first, and may be further defined based on a distance between the touches, a preset pattern of input regions stored in memory, or user configuration inputs. Thus, a position or center of the primary input region can be determined based on the first touch, positions of secondary input regions can be determined based on subsequent touches, and the relative sizes and shapes of the primary and secondary input regions can be determined by the relative positions of the touches, within a context derived from initial data (e.g., a selected avatar or character). The input regions are associated with respective input mechanisms or commands in the configuration data. While the configuration data is implemented, the touchscreen display can monitor for touches, detect touch input in the configured regions, and generate activation data for each input mechanism or command in response to touch. The positions and shapes of the input regions may be iteratively redefined as touch input is monitored on the touchscreen display The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
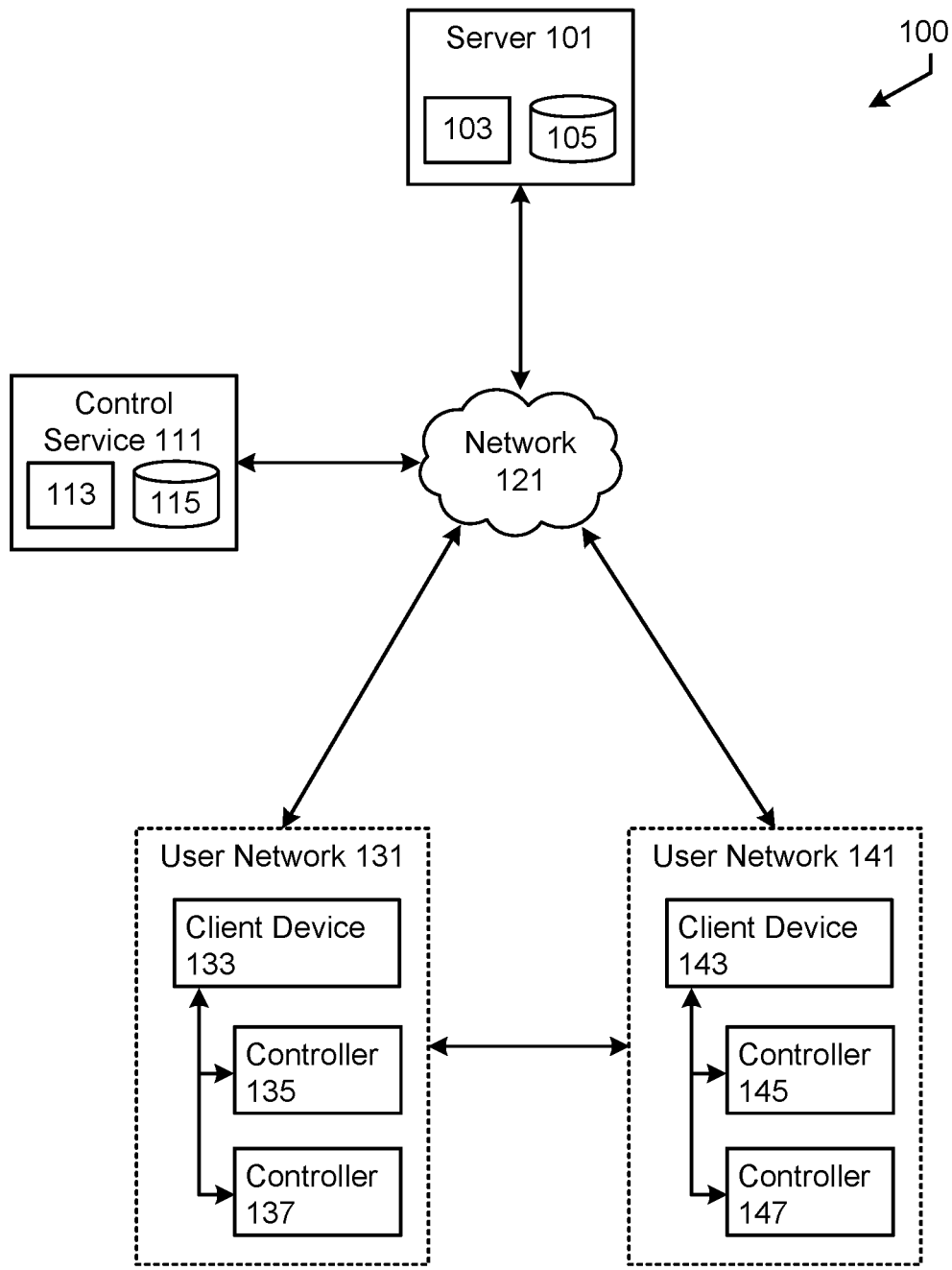
FIG. 1 is a simplified system diagram illustrating a service environment in which a virtual controller can be used, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to techniques for simulating the feel and functionality of input mechanisms (e.g., buttons on a physical video game controller) on a flat screen device. The disclosed methods may also be used to customize the on-screen layout of the buttons based on a user's preferences, a particular application (e.g., game) being operated, actual usage by the user, or based on a particular character or avatar being operated by the user. The techniques can be further extended by allowing users to customize the parameters of the button layout based on personal preferences or comfort.

Embodiments of the disclosure provide for a number of advantages over conventional systems. While a number of conventional systems have attempted to adapt input mechanisms to a touchscreen device, a number of problems still persist in this field. For example, Without the change in physical sensation from sliding their thumb across a controller and feeling the raised edge of a button, how does the user know a button is there without looking on a flat screen? When a user pushes a button on a flat screen, how do they know they have done so without the tactile "click" of a physical button? Physical controllers are optimized for a "resting" hand and thumb position that makes it easy to trigger adjacent buttons from muscle memory without looking. How do you accomplish this on a flat screen device?

Some games implemented on touchscreen devices try to solve some of these problems by having virtual button layouts that are accessible with your right thumb (as in, you can easily move your right thumb to hit on-screen buttons), but rely on you to look at the button placement and use your peripheral vision to see that your thumb is making contact with the intended button (or the user notices they are touching the screen intending to trigger a button press but no input is actually being provided so they adjust their hand).

Some games allow players to customize the location and size of on-screen buttons to make it easier for users to set up a layout that works for their hand size, but still relies on players to use their peripheral vision to determine the location of buttons and has limited feedback to indicate that a button press has occurred.

In contrast, embodiments of the present disclosure involve registering that a button is "pressed" when a user provides input in a specified button region (as opposed to "pressed" when the user touches and releases the button region). When a button is pressed, the system may provide haptic feedback, change the graphical representation of the icon, and/or play an audio effect. This means that without looking at their thumb position, the user can slide their right thumb across the flat screen and know when they have triggered the button through haptic feedback and audio. In conjunction with this notification scheme, a layout of buttons may be arranged custom to the application (e.g., game) or character that the user is controlling.

For example, in some embodiments, a "primary button" is positioned across a natural center of the touchscreen region, and at least partially surrounded by adjacent buttons that the user can slide their thumb to in a radial fashion without looking. The primary button may be associated with the main ability for the character, i.e., is the button we expect the user to rest their thumb on or tap repeatedly: and the radially arranged secondary buttons may correspond to ancillary or secondary skills that are used less often or in conjunction with the main ability. In use, when the user slides their thumb to an adjacent button from the primary button with or without lifting, the button press is triggered, the previous button is released, and the user has physical, aural, and visual feedback to know they triggered the button. Importantly, for games in which multiple characters can be used, the button scheme can change automatically when a different character is selected without altering the feel of the controls. For example, the primary skill may remain central and the ancillary buttons may change in response to the selection of the character in use.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., console-specific controllers, cross-compatible controllers, or virtual controllers) with connectivity hardware and protocols for communicating with their respective client device 133. According to some embodiments, controller 135 can be a virtualized controller operating on a thin-client device or touchscreen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2A:
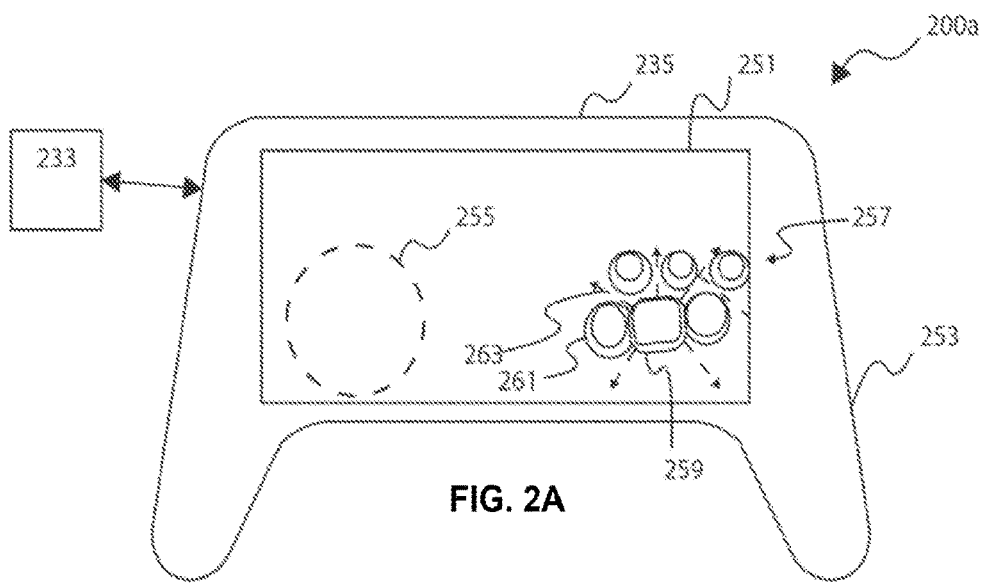
FIG. 2A depicts a first example button configuration that may be implemented in accordance with embodiments.
Figure 2B:
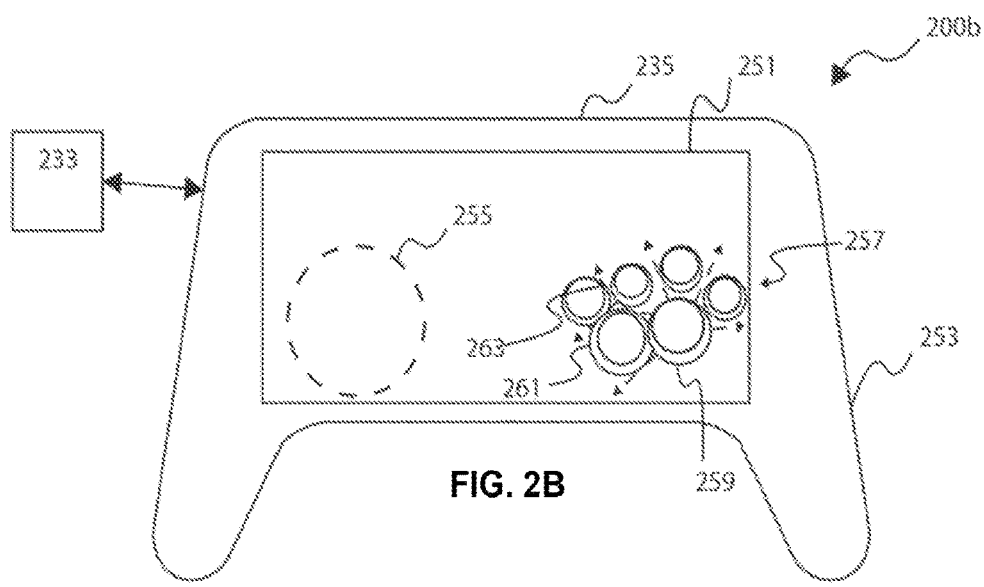
FIG. 2B depicts a second example button configuration that may be implemented in accordance with embodiments.
Figure 2C:
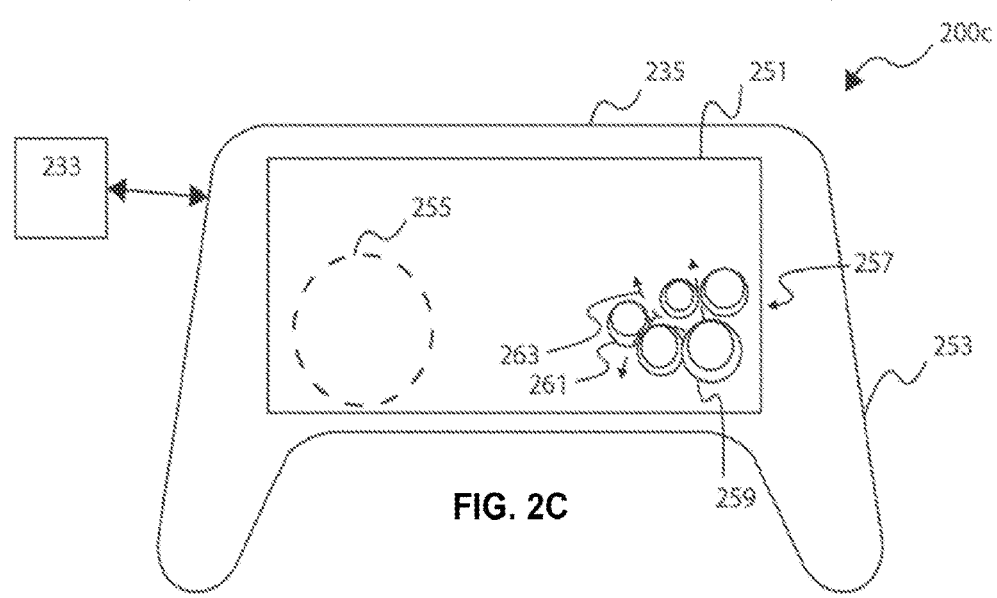
FIG. 2C depicts a third example button configuration that may be implemented in accordance with embodiments.

FIGS. 2A-2C illustrates example button configurations 200a-c that correspond to a control scheme employing a virtual controller 235 in communication with a video game system 233, in accordance with various embodiments. The displayed button arrangement 257 can change with different characters in a game utilizing a touchscreen interface 251.

FIG. 2A depicts a first example button configuration that may be implemented in accordance with embodiments. In the first configuration 200a as shown in FIG. 2A, a movement region 255 is present on the left side of the screen 251 and a button arrangement 257 is displayed on the right side of the screen, though it will be understood that the left-right configurations may be switched.

In this example, a primary button 259 is located at an ergonomically central location relative to the touchscreen 251 with respect to the location of a user's thumb, particularly in embodiments where the virtual controller 235 includes handles 253 or similar ergonomic features. The primary button 259 refers to an input region that can include visible cues (i.e., a projected button) at least partly defined by the primary button's input region, however, the input region of the primary button may extend beyond what's visible in any on-screen cues. In some embodiments, the primary button may not be visible on screen.

Secondary buttons 261 that correspond to secondary input regions are arranged in a pattern around the primary button 259, however, like the primary button, visual cues for the secondary buttons may not correspond directly to the input regions thereof—i.e., the exact boundary of the visual cue may align with the corresponding input region, or may be slightly offset. Input regions of the secondary buttons 261 may be separated by boundaries 263 that are not displayed to the user. In some embodiments, the secondary input regions radiate outward from the location of the primary button. Additional input regions may be stacked farther away from the primary button.

FIG. 2B depicts a second example button configuration that may be implemented in accordance with embodiments. The same elements with the same numbering are shown in FIG. 2B as in FIG. 2A, with subtle variations in button number, sizing and location.

In some cases, the primary button 259 may be "central" to several ancillary buttons 261 (e.g., as shown in both FIGS. 2A and 2B). A particular position, size, and/or shape of the primary button 259 may be modified in accordance with the techniques described herein.

FIG. 2C depicts a third example button configuration that may be implemented in accordance with embodiments. As depicted in FIG. 2C, in some other cases the primary button may occupy the corner of the touchscreen 251 and may have radial secondary buttons 261 positioned toward an interior of the touchscreen 251. In any event, the locations, sizing, and number of buttons can be varied based on context. For example, the locations, sizing, and number of buttons can be varied to correspond to the move sets of individual game characters or even to meet the needs of entirely different games.

Figure 3:
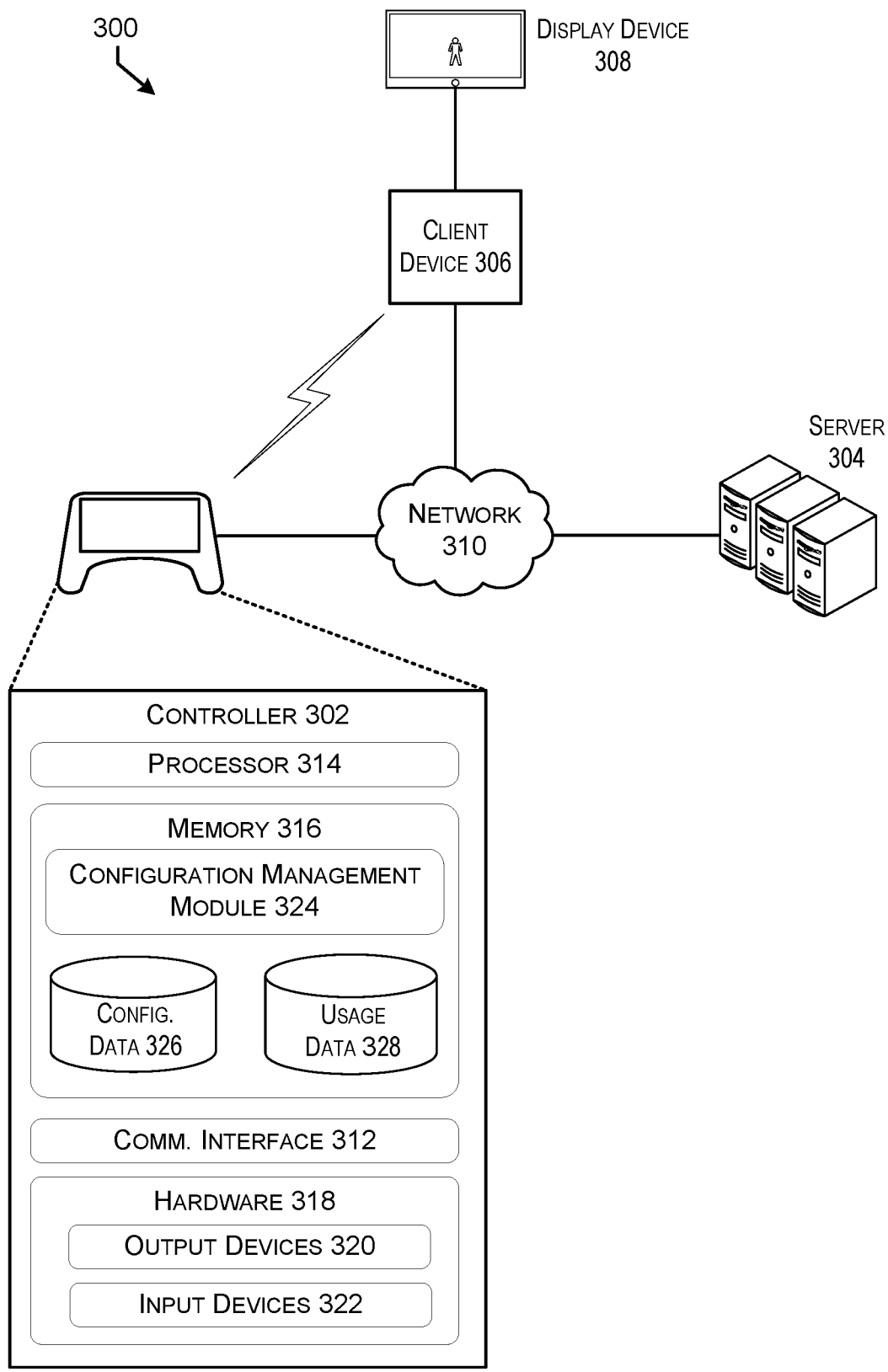
FIG. 3 is a block diagram showing various components of a computing system architecture that supports implementation of a virtualized physical controller in accordance with embodiments.

FIG. 3 is a block diagram showing various components of a computing system architecture that supports implementation of a virtualized physical controller in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display device 308. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities. The controller 302 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, touchscreens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to maintain and implement configuration information for input mechanisms of a virtualized controller (e.g., configuration management module 324).

Additionally, the memory 316 may include various data stores. For example, the memory 316 may maintain data about virtualized controller configurations based on context (e.g., configuration data 326). In some embodiments, the memory may further include data about user interactions with the virtualized controller (e.g., usage data 328).

The configuration management module 324 may be configured to, in conjunction with the processor 314, generate and manage configuration information in relation to an arrangement of one or more input mechanisms within a user interface presented on the controller 302. In some embodiments, the configuration management module may be configured to receive input from a user indicating a position on a touchscreen display to be associated with a particular input mechanism (e.g., button). In some cases, the user may be prompted to hold the controller, move his or her thumb or other finger into a position that is comfortable for the user, and then touch the touchscreen display at that point. Upon sensing the user's touch on the touchscreen display, the configuration management module may be configured to associate the location of the touch with a particular input mechanism. A similar process may be performed for each of a number of input mechanisms. Once the configuration management module has collected input location data for each input mechanisms, that location data may be stored as configuration data within the memory 316. In some cases, the configuration data stored in the controller may be specific to a particular user, software application, or avatar.

In some embodiments, the configuration management module may be called (e.g., by an executed software application) via an application programming interface (API). In some cases, information specific to the implementation of a virtual controller configuration may be passed from the software application to the configuration management module 324 via a call to the API. Upon activation of the controller for use with a software application, such as a game, the configuration management module 324 may be configured to identify and implement an appropriate input mechanism configuration. In some embodiments, such an implementation may be specific to some combination of the software application being executed, a user currently using the controller (e.g., as identified via a user login, for example), and/or one or more conditions specific to the software application (e.g., a particular character or avatar being played). To implement a configuration, the configuration management module 324 may assign areas within a touchscreen to particular input mechanisms such that as a touch is detected at a location, the configuration management module generates an input that corresponds to one or more input mechanisms assigned to that location. Such input may then be relayed to the software application (e.g., via the API). In some cases, activation data is generated that corresponds to the activated input mechanism and that activation data is relayed to the software application.

In some embodiments, activation data generated in response to selection of a particular input mechanism may include information about how, or to what degree, the user has activated the input mechanism. For example, if a touch by the user originates within a region assigned to an input mechanism, and the touch is then determined to move, then the configuration management module may determine that the touch is a swipe operation. The generated activation data may indicate the swipe operation as well as a distance of the swipe operation, a direction of the swipe, an ending location for the swipe, or any other suitable information. In some embodiments, a swipe operation may continue to be associated with an input mechanism even if the swipe continues outside of the region associated with that input mechanism if the swipe started within the region.

In some embodiments, the configuration management module may be further configured to update configuration data. In some cases, such an update may be made at the request of a user. In other cases, such an update may be made automatically. For example, when a particular virtual controller configuration has been implemented, the configuration management module may monitor touch inputs entered by a user operating the controller. Those touch inputs may be aggregated over time to assess whether a current location of an input mechanism is appropriate. This is described in greater detail with respect to FIG. 6 below.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game).

Figure 4:
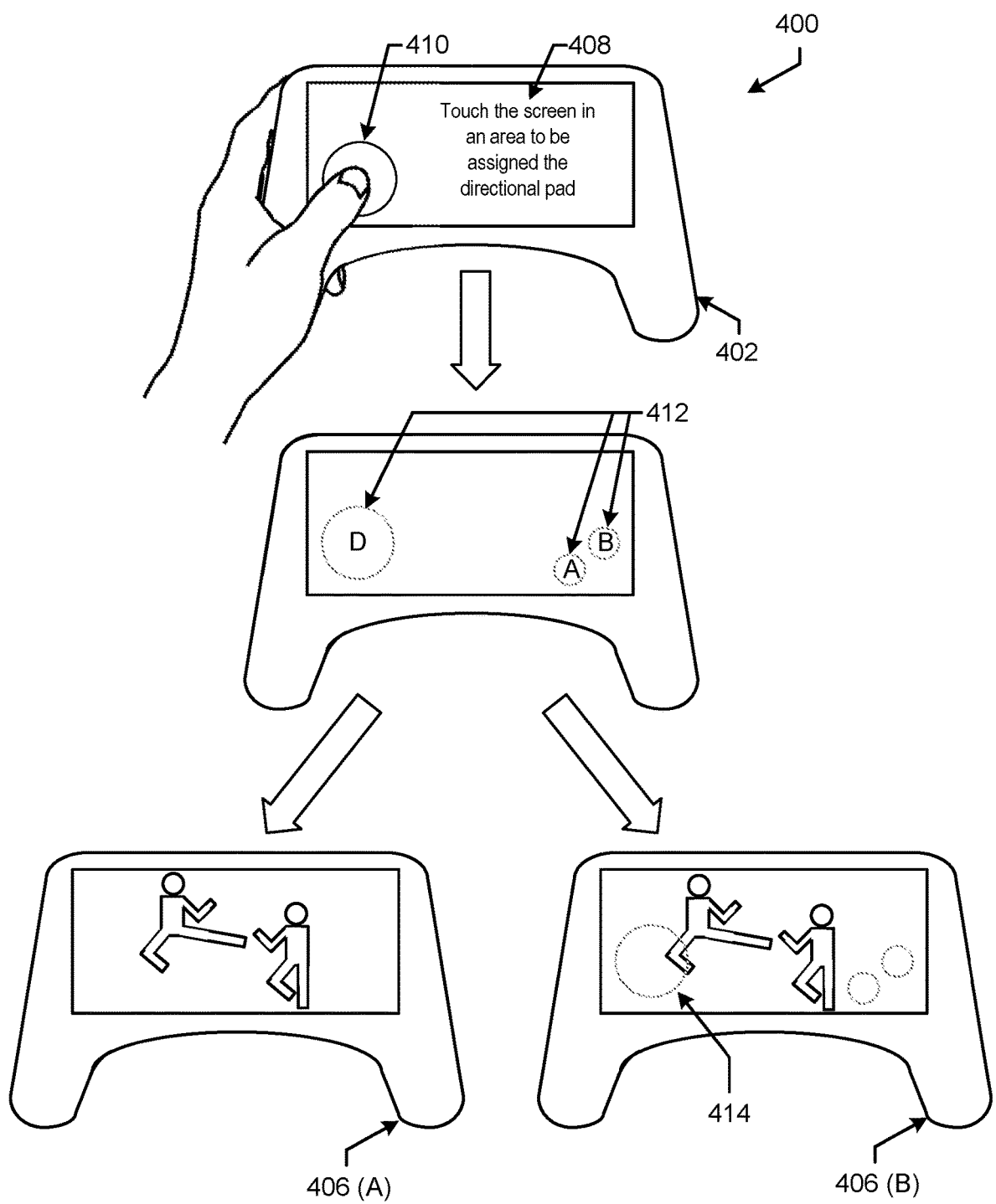
FIG. 4 depicts a graphical illustration of a process for configuring and implementing a virtualized physical controller in accordance with embodiments.

FIG. 4 depicts a graphical illustration of a process for configuring and implementing a virtualized physical controller in accordance with embodiments. Particularly, FIG. 4 depicts graphical illustrations related to inputting configuration data on a user device 402, generating configuration data by assigning inputted locations to various input mechanisms on a user device 404, and implementing a virtualized physical controller using the generated configuration data on a user device 406.

As depicted at 402, configuration data may be generated from input received from a user of a user device. In some embodiments, the input may include an indication of an identifier (e.g., a button name) associated with an input mechanism to be added to a configuration. For example, a user may select a button from a list of buttons presented to the user on a screen of the user device. Upon identification of an input mechanism to be added to the configuration data, positional data may be assigned to that input mechanism based on received user input. In some embodiments, the user is provided with a prompt 408 to select a position within the touchscreen display. In these embodiments, when prompted, the user may respond by touching the touchscreen at a position 410 that s/he wishes to associate with the identified input mechanism. In other embodiments, the user may be asked to drag and drop a graphical illustration of a particular button to a location on the touchscreen that the user would like to associate with the button.

As depicted at 404, each of several input mechanisms may be assigned to regions 412 located on a touchscreen display. In some embodiments, a size and/or shape may also be assigned to each of the regions for the input mechanisms. It should be noted that in some cases, an input mechanism may be assigned to multiple different regions, such that the resulting configuration may include multiple instances of the same input mechanism. Additionally, two or more input mechanisms may be assigned to regions that overlap, such that a selection of the area in the overlapping regions within the implemented configuration may result in triggering each of the two or more input mechanisms.

As depicted at 406, the generated configuration may be implemented with respect to an executed software application. For example, upon execution of a software application, such as a game, a virtual controller may be instantiated on the user device. In this example, the software application may make a call to an API associated with the virtual controller to be implemented. The call to the API may include information that is used to identify a particular virtual controller configuration to be implemented. In some embodiments, this may involve instantiating a graphical overlay on the user device over the presentation of the software application. In some embodiments, as depicted at 406 (A), no visual representations of the input mechanisms or their corresponding regions may be made visible to a user. In other embodiments, as depicted at 406 (B), visual representations 414 of the input mechanisms or their corresponding regions may be made visible to a user.

Upon implementation, input provided to the user device may be monitored to determine when one or more input mechanisms have been activated. In some embodiments, this may involve monitoring touch data input from a user and determining whether the location of that touch data is within a region associated with one or more input mechanisms. In some cases, the user may touch the screen with his or her finger within one or more regions associated with input mechanisms. In some cases, the user may touch the screen with his or her finger and may drag his or her finger across one or more regions associated with input mechanisms. Upon detecting that an input mechanism has been selected, the virtual controller may be configured to provide feedback to the user indicating the selection of the input mechanism. For example, the virtual controller may provide aural (e.g., audio sound), visual, or haptic feedback to the user of the virtual controller. In some cases, the feedback provided to the user may vary based on the identity of the input mechanism selected. The virtual controller may further be configured to provide user input to the software application based on which input mechanisms are selected and as those input mechanisms are selected.

Figure 5:
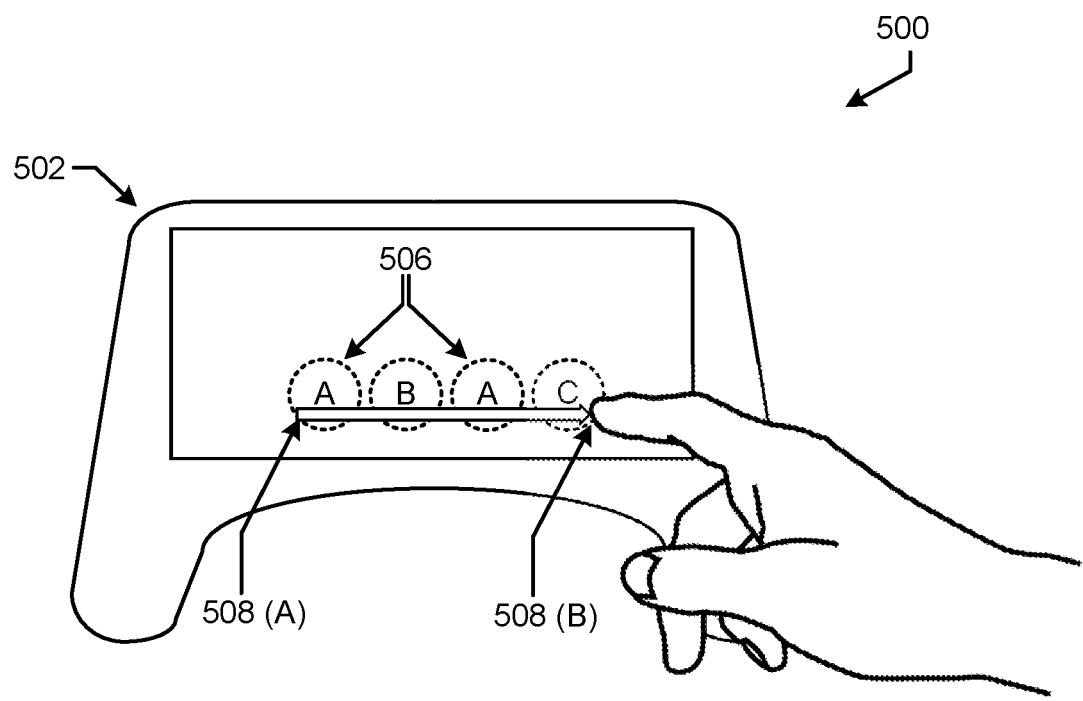
FIG. 5 depicts graphical illustrations of various examples of virtual controller configurations that may be implemented in accordance with some embodiments.
Figure 5:
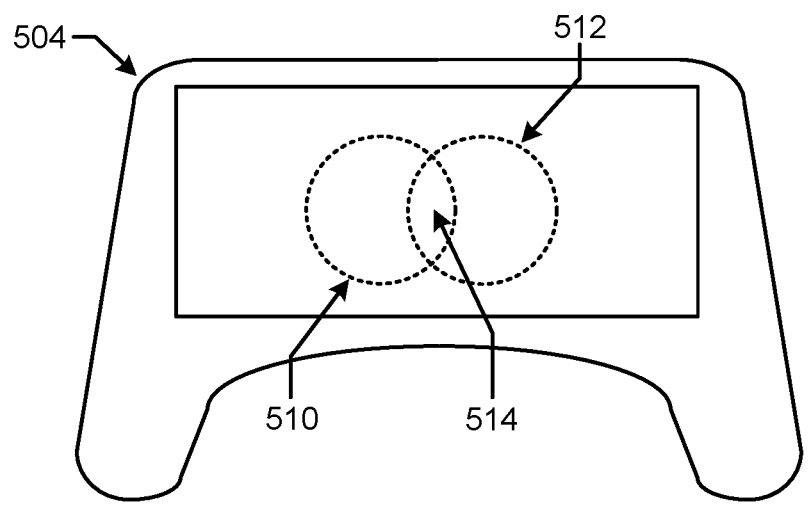

FIG. 5 depicts graphical illustrations of various examples of virtual controller configurations that may be implemented in accordance with some embodiments. In the depicted examples, a first exemplary controller 502 is depicted as implementing a virtual controller having multiple instances of one or more input mechanisms. Additionally, a second exemplary controller 504 is depicted as implementing a virtual controller having two regions associated with different input mechanisms that overlap.

As previously noted, stored virtual controller configuration data may include a mapping of correlations between a number of regions located on a touchscreen display and a number of input mechanisms. In some embodiments, one or more input mechanisms may be mapped to multiple different and separate regions on the touchscreen display. Accordingly, when the virtual control configuration is implemented as described herein, multiple instances (e.g., 506) of a single input mechanism may be displayed on the touchscreen display at different locations. Particularly, each of the different instances of the input mechanism may be implemented at their corresponding locations. In the depicted virtual controller example, a user may touch the touchscreen display at a first location 508 (A) and drag his or her finger to a second location 508 (B). In this example, each of the input mechanisms between the first location 508 (A) and the second location 508 (B) may be activated as the user's finger enters the region associated with the respective input mechanism. When an input mechanism is activated in such a manner, a signal specific to that input mechanism is generated and provided to a software application that is being executed, which may then interpret the signal.

It should be noted that embodiments of a virtualized physical controller that are capable of including multiple instances of a single input mechanism may provide significant benefit over a conventional controller. For example, a user that is able to place multiple instances of the input mechanism in a row is able to swipe across the multiple instances instead of tapping those instances. In another example, if a user alternates instances of two different input mechanisms along a straight line, then swiping along that line would result in generating input that would typically require alternating tapping on two different buttons. Note that in these examples, the implementation of multiple instances of an input mechanism in this manner may make operation of the controller easier as well as facilitate the use of the controller by people with disabilities.

In some embodiments, a virtual controller configuration may include one or more regions associated with different input mechanisms that overlap. For example, an input region 510 associated with a first input mechanism may overlap with an input region 512 that is associated with a second input mechanism. In this example, an area 514 may result from the overlap between the two regions. Upon detecting that a user has touched the touchscreen display within the area 514, each of the first and second input mechanisms may be activated simultaneously. It should be noted that this is also advantageous over a physical controller in that such a physical controller would typically require that two buttons be depressed simultaneously to achieve the same result.

Figure 6:
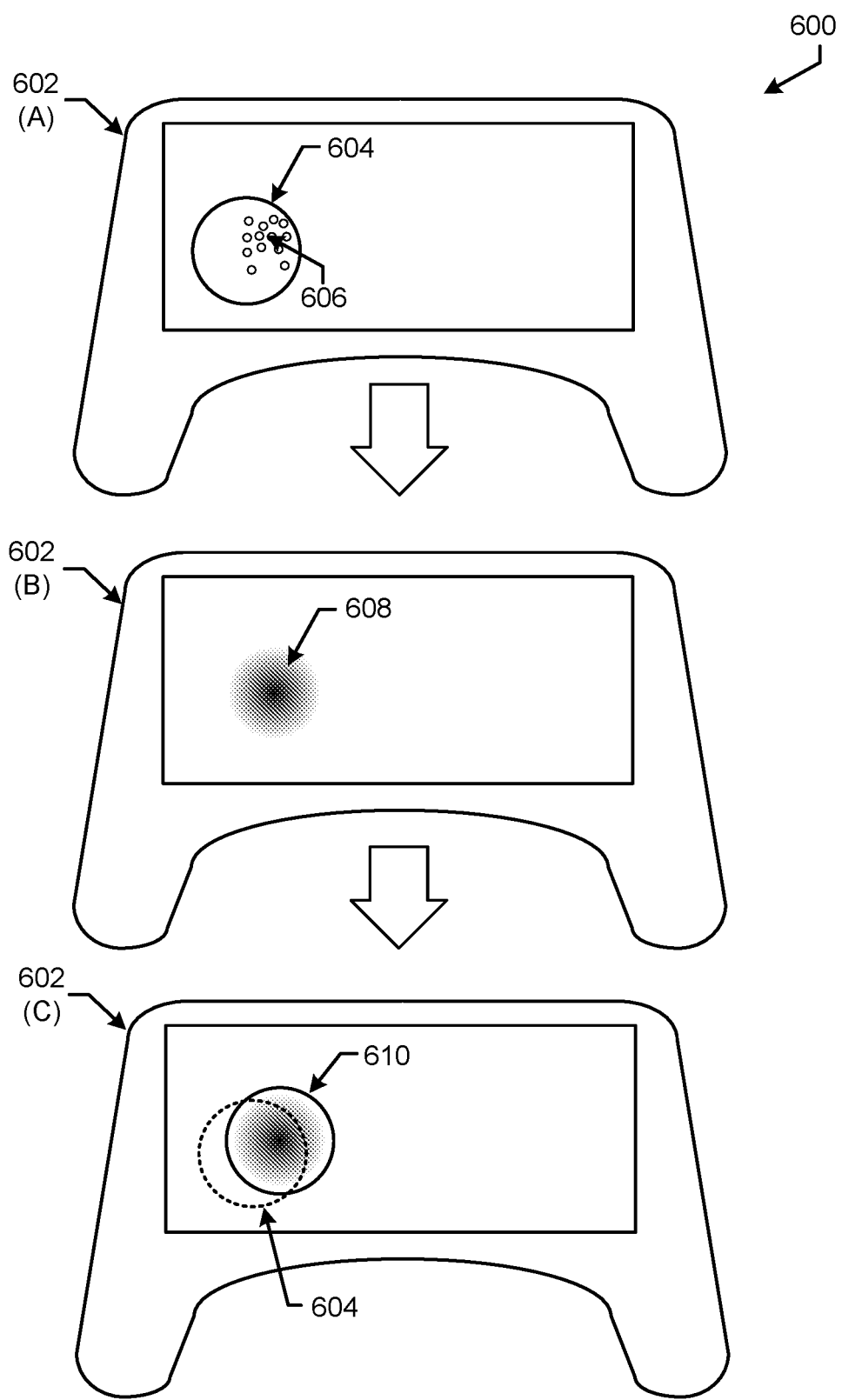
FIG. 6 depicts a graphical illustration of a process for adjusting a virtual controller configuration in accordance with embodiments.

FIG. 6 depicts a graphical illustration of a process for adjusting a virtual controller configuration in accordance with embodiments. The process 600 is depicted on a series of images of a user device 602 (A-C) on which a virtual controller may be implemented. The virtual controller configuration data may include an indication of a region 604 associated with an input mechanism.

In some embodiments, virtual controller configuration data may be adjusted or updated at various points in time. In some embodiments, the virtual controller configuration data may be updated upon receiving a request to do so. In some embodiments, the virtual configuration data may be updated automatically (e.g., without human interaction) upon a determination being made that an update should be made.

In some embodiments, usage data 606 may be maintained that includes information on user touch location input provided by a user during operation of a virtualized physical controller on the user device 602 (A) over a period of time. Such usage data 606 may include locations corresponding to places on a touchscreen display that a user has touched when interacting with a particular input mechanism.

In some embodiments, the usage data may be aggregated to generate a usage distribution 608 that represents a distribution of user touch probabilities throughout a region on the user device 602 (B). Such a usage distribution 608 may be centered at a location at which the user is most likely to touch the touchscreen display when attempting to activate the input mechanism.

In some embodiments, a distance may be determined between a center of the usage distribution 608 and the center of the region 604. In these embodiments, if the determined distance is greater than a threshold distance, then a determination may be made that the virtual controller configuration data should be updated to move the location of the region 604. Upon a determination being made that the location of the region is to be updated, the region 604 may be moved such that it is centered on the usage distribution 610. It should be noted that other aspects of a region indicated in configuration data may be updated in this manner. For example, a size and/or shape of the region may be updated in addition to, or instead of, the position of such a region.

Using the techniques described herein, locations of regions associated with input mechanisms stored within virtual controller configuration data may be updated as a user's usage of the virtual controller changes. For example, as a user grows, the placement of that user's hands on a user device may change and the locations of various regions may also need to be updated.

Figure 7:
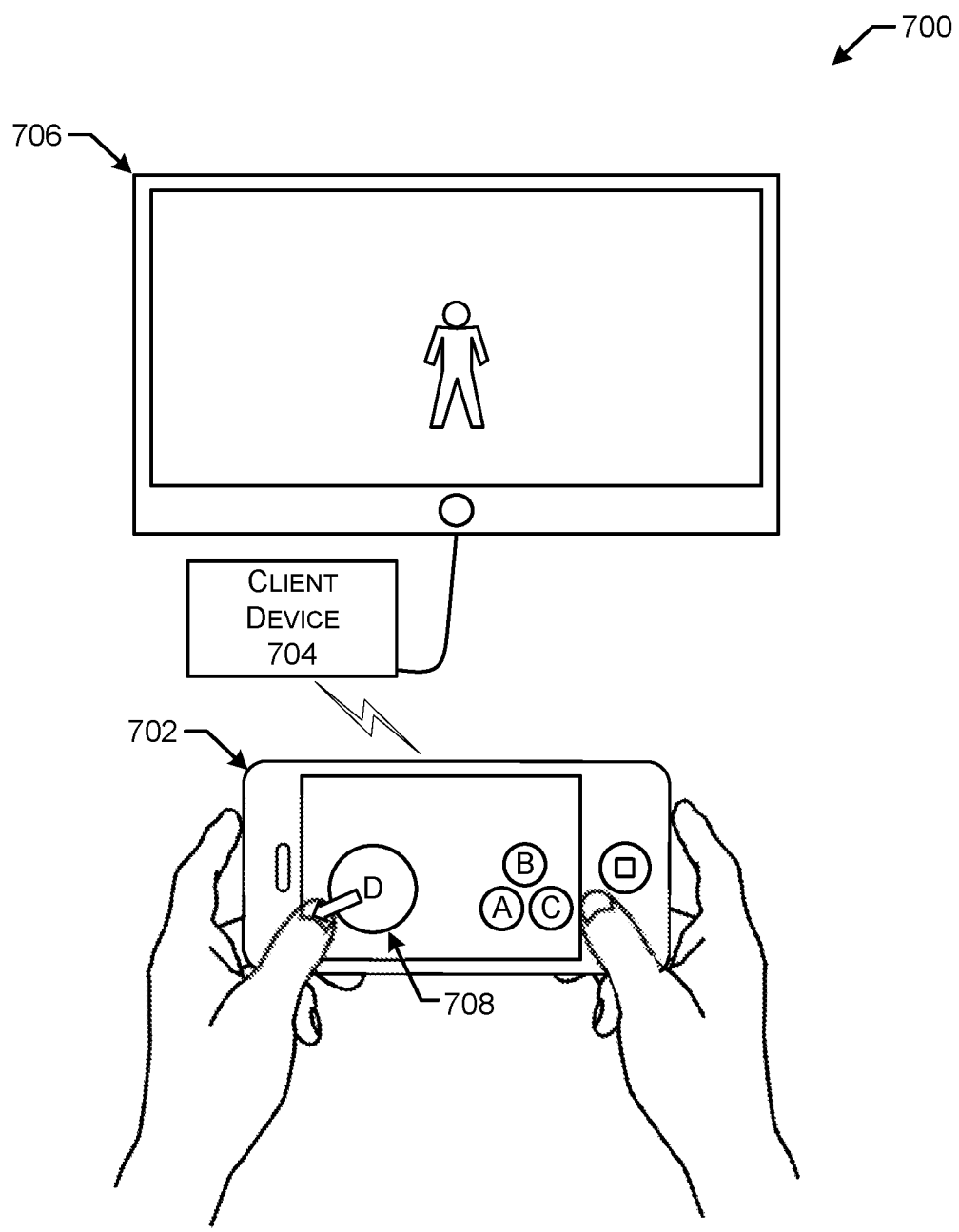
FIG. 7 depicts an illustration of a virtual controller implemented on a user device that may be used as a controller for a separate client device in accordance with embodiments.

FIG. 7 depicts an illustration of a virtual controller implemented on a user device that may be used as a controller for a separate client device in accordance with embodiments. As depicted in the system 700, a user device 702, having implemented thereon a virtualized physical controller, may be in communication with a client device 704, such as a gaming console. In some embodiments, the client device 704 may be further in communication with a display device 706, such as a television.

In some embodiments, a device discovery process may be performed by the user device. Upon performance of such a process, the user device may discover the client device and a communication session may be established between the user device 702 and the client device 704. In some embodiments, the client device 704 may direct the user device to obtain a software application that facilitates interaction between the two. For example, the client device, upon establishing communication with the user device, may direct the user device to download a software application associated with the client device. Communications between the user device and the client device may then be facilitated by that software application.

In embodiments, the virtualized physical controller, when instantiated on the user device, may be used to convey input received from the user, via the touchscreen display, to the client device. That input may then be used to control a character in a video game executed on the client device.

Figure 8:
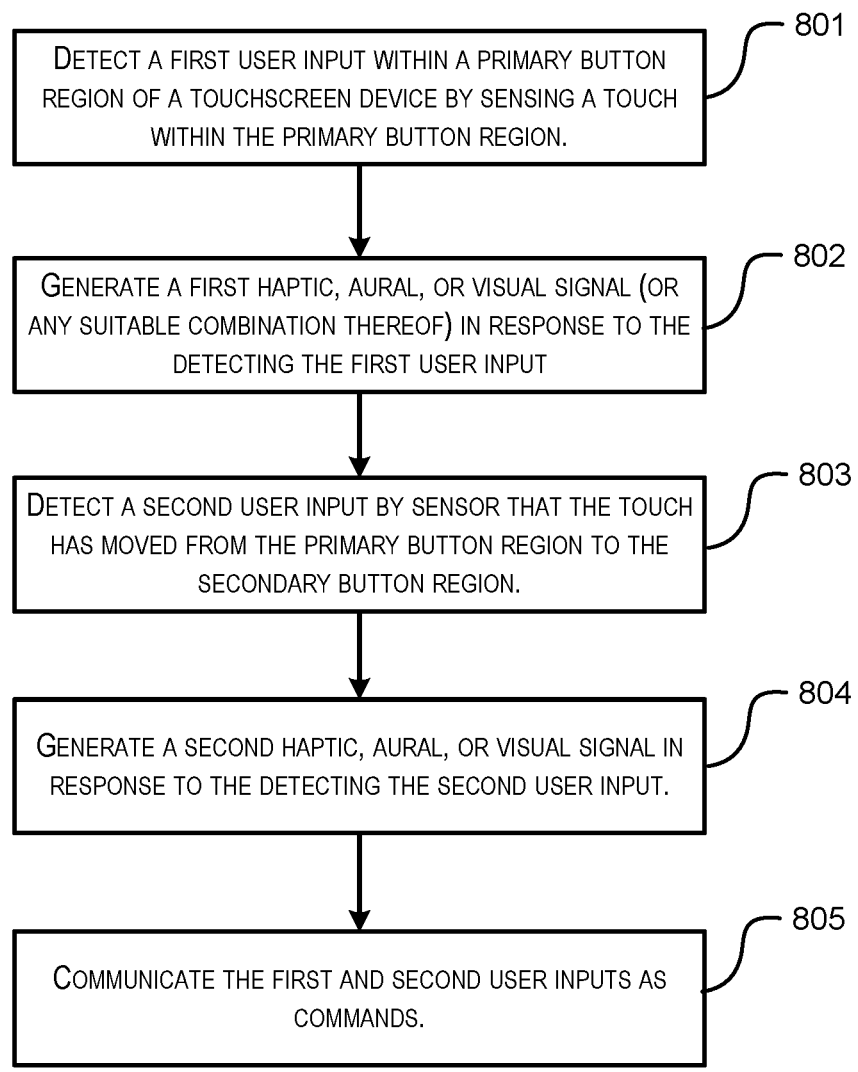
FIG. 8 depicts a flow diagram showing an example process flow for sensing button presses in a virtual controller in accordance with embodiments.

FIG. 8 depicts a flow diagram showing an example process flow 800 for sensing button presses in a virtual controller as described in FIGS. 2A-2C. The process 800 can be performed in any suitable service environment, including but not limited to service environment 100 shown in FIG. 1.

In accordance with various embodiments, process 800 includes detecting a first user input within a primary button region of a touchscreen device by sensing a touch within the primary button region at 801. The system can then generate a first haptic, aural, or visual signal (or any suitable combination thereof) in response to the detecting the first user input at 802. A second user input within a secondary button region of the touchscreen device can be detected by sensing that the touch has moved from the primary button region to the secondary button region of the touchscreen device at 803, which can cause the system to generate a second haptic, aural, or visual signal in response to the detecting the second user input at 804. The first and second user inputs register as commands to be communicated to the gaming system at 805.

According to various embodiments, the primary button region is arranged at a natural location at which a user's thumb rests when the user is holding the virtualized controller, and the secondary button region comprises one of multiple ancillary button regions arranged radially around the primary button region. However, the exact positioning of the regions can also be modified to adapt to the user's hand as follows.

Figure 9:
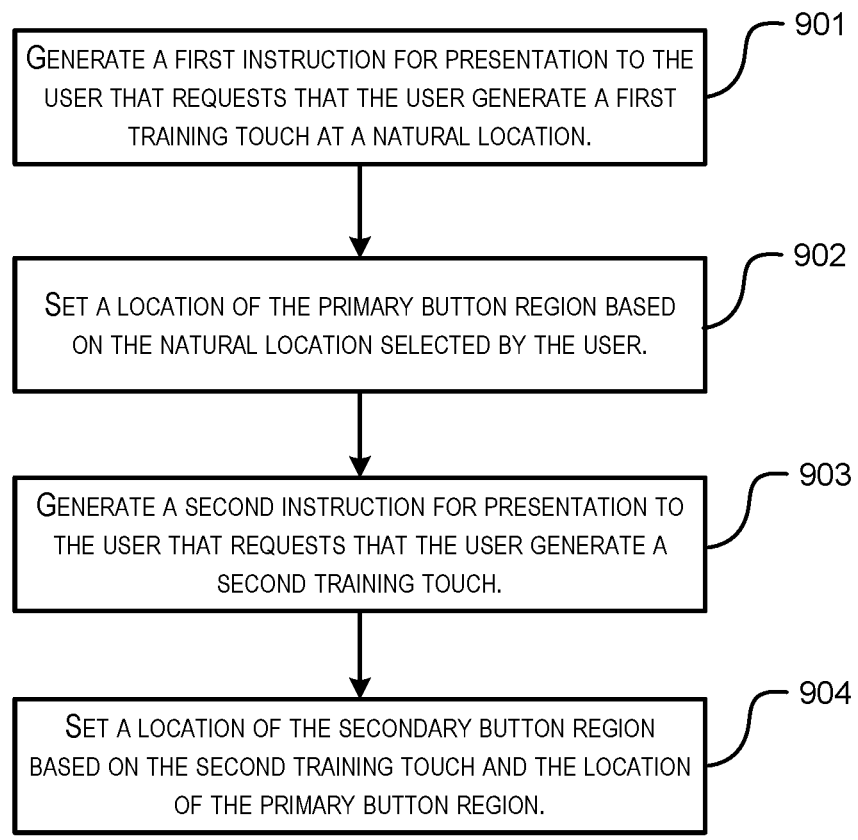
FIG. 9 depicts a flow diagram showing an example process flow for adapting the primary and ancillary button locations of a virtual controller in accordance with various embodiments.

FIG. 9 depicts a flow diagram showing an example process flow 900 for adapting the primary and ancillary button locations of a virtual controller in accordance with various embodiments. The process 900 can be performed in any suitable service environment, including but not limited to service environment 100 shown in FIG. 1. For example, process 900 includes the system generating a first instruction for presentation to the user that requests that the user generate a first training touch by placing their thumb at a natural location at 901. In response to detecting the first training touch by the user, the system can set a location of the primary button region based on the natural location selected by the user at 902. The system can generate a second instruction for presentation to the user that requests that the user generate a second training touch by placing their thumb at a second location different from the natural location, e.g., a location for a secondary button at 903. In response to detecting the second training touch by the user, the system can then set a location of the secondary button region at 904.

The system can refine the position, size, and location of ancillary buttons (i.e., the "spread" of the control scheme) based on repeated calibration requests as described above until a control scheme has been achieved that requires minimal looks by the user. Thus, the button positioning, and sizing can be determined in part (at least initially) via a training module in which a user is instructed to place their control thumb or finger on screen in a natural location without looking at the screen, and then instructed to move their control thumb or finger in a pattern corresponding to the number of ancillary buttons in one or more directions from the natural location. One or multiple presses at the "natural" location instruct the module to define a center of the primary button, and one or multiple presses at the ancillary locations instruct the module to define edges of the primary button and, by extension, regions that will correspond to the ancillary buttons.

In some embodiments, user touch input may be monitored during the user's operation of the virtualized controller over time. For example, each time that touch input is received in relation to one or more of the input mechanisms, a location of that touch input is recorded. A sample of touch input locations associated with each of the input mechanisms may be used to update and/or define a region associated with the respective input mechanism, as described with respect to FIG. 6 above. In some cases, the region associated with each input mechanism may be updated automatically (e.g., absent user interaction) as the controller is used. Such use may occur during operation of the controller, even when the controller is not being operated in a training state.

Figure 10:
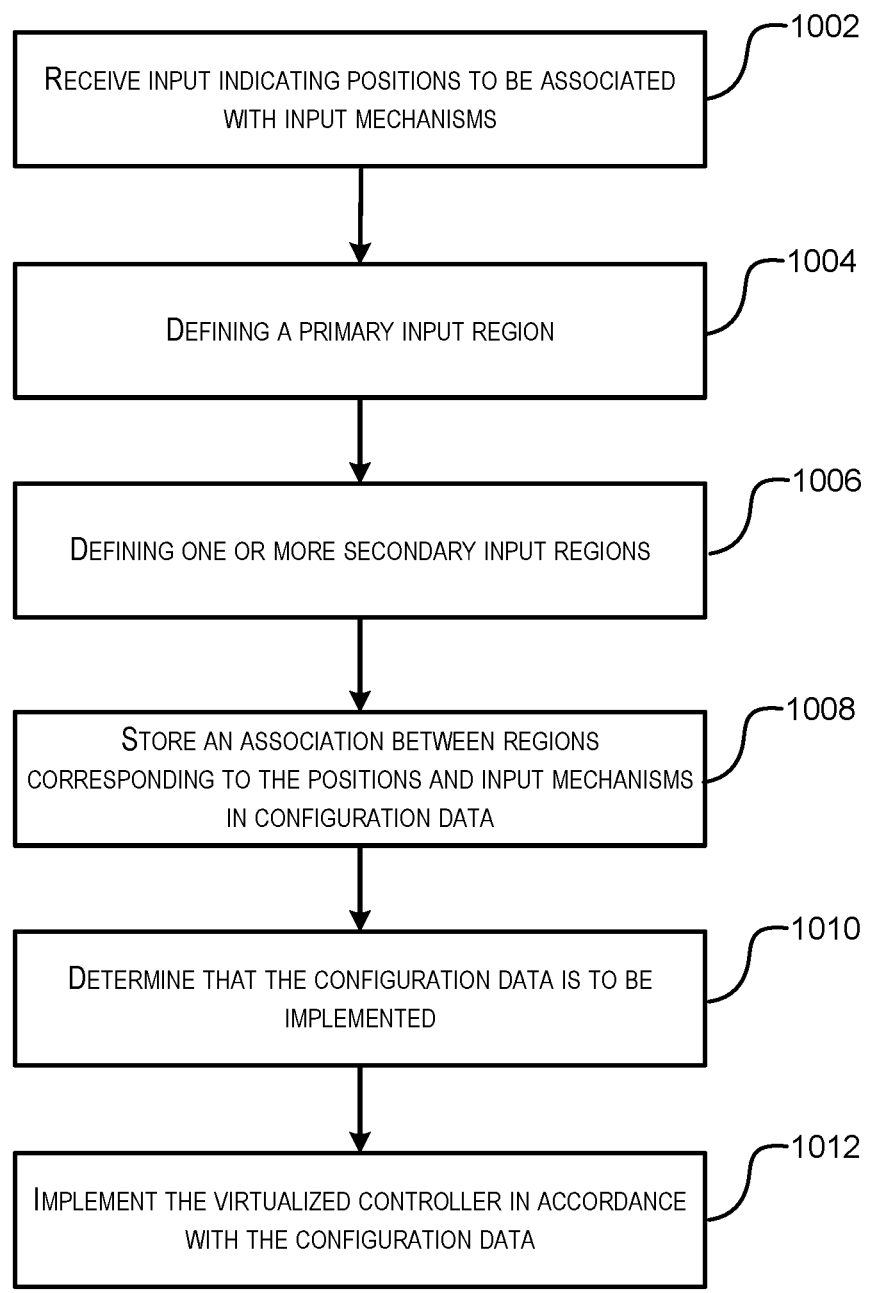
FIG. 10 depicts a flow diagram showing an example process flow for generating an implementing a virtualized physical controller in accordance with embodiments.

FIG. 10 depicts a flow diagram showing an example process flow 1000 for generating an implementing a virtualized physical controller in accordance with embodiments. The process 1000 may be performed by a computing device that is configured to generate and provide a product strategy for a product. For example, the process 1000 may be performed by an operation optimization platform, such as the operation optimization platform 104 described with respect to FIG. 1 above.

At 1002, the process 1000 comprises receiving input from a user indicating one or more positions on a touchscreen display, the one or more positions intended to be associated with input mechanisms. In some embodiments, the input received from the user comprises a touch by the user to the touchscreen display while grasping the user device using a natural grasp. In some embodiments, the input received from the user comprises an indication of the user dragging and dropping one or more input mechanisms to the respective one or more positions on the touchscreen display. In some embodiments, in addition to information about a position to be stored in relation to a region associated with an input mechanism, information may also be stored about a size, orientation, and/or shape of the region.

At 1004, the process 1000 comprises defining a primary input region based on a first position of the first touch. In some embodiments, the first position of the first touch may be located at a position on the touchscreen device at which a user's thumb or finger can comfortably reach.

At 1006, the process 1000 comprises defining one or more secondary input regions based at least in part on relative positions of the one or more second touches with respect to the first touch. In some embodiments, the one or more secondary input regions may be arranged radially about the primary input region. In some embodiments, the one or more second touches may be arranged a predetermined distance from a center of the first position.

At 1008, the process 1000 comprises storing an association between the regions corresponding to the indicated positions and corresponding input mechanisms in configuration data. In some embodiments, the configuration data comprises multiple separate regions associated with a single input mechanism of the one or more input mechanisms. In some embodiments, the one or more regions associated with at least two of the one or more input mechanisms within the configuration data may overlap. In such cases, upon detecting that the touch input is located within the overlap, input for each of the at least two input mechanisms is generated.

At 1010, the process 1000 comprises determining that the configuration data is to be implemented. In some embodiments, the configuration data is determined to be implemented based at least in part on at least one of a software application that is executed, an identity of the user, or a character being played in the software application. In some embodiments, determining that the configuration data is to be implemented comprises receiving a request to implement the configuration data via an application programming interface by a software application executed on a user device. In these embodiments, the configuration data may be implemented via a graphical overlay presented over the software application executed on the user device.

At 1012, the process 1000 comprises implementing the virtualized physical controller in accordance with the configuration data. This may involve monitoring touch input on the touchscreen display, detecting touch input within the one or more regions, and generating input corresponding to the at least one respective input mechanism of the one or more input mechanisms. An activation data may be any data intended to be generated upon activation of a particular input mechanism. For example, upon determining that a particular button has been pushed or otherwise activated by a user, activation data may be generated that includes an identifier for that button. In some embodiments, a determination may be made, based on a movement associated with the touch data, that the touch input comprises a swipe operation. In these embodiments, the activation data may further comprise information about a distance of the swipe operation, a direction of the swipe, or an ending location for the swipe.

In some embodiments, the process 1000 further comprises providing feedback to the user upon detecting the touch input within the one or more regions. Such feedback may include any combination of haptic, aural, or visual signals. In some cases, the feedback may be provided as soon as the user's touch is detected within a region associated with an input mechanism (as opposed to when the user releases his or her touch).

In some embodiments, the process 1000 may further involve updating the configuration data automatically (e.g., without human interaction). In such embodiments, the touch input may be aggregated and/or stored as usage data. Updating the configuration data may involve generating distribution data based on the usage data and updating the one or more positions associated with the input mechanisms based on the distribution data. In some embodiments, the one or more positions associated with the input mechanisms are updated to be centered on the generated distribution data. In some embodiments, the configuration data is updated if a distance between the one or more positions and a center of the distribution data is greater than a threshold distance.

The methods described herein are directed to virtual controllers, i.e., controllers that use a touchscreen or touchscreen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following, further examples are described to facilitate understand of aspects of the invention:

Example A. A method comprising:
  receiving, from a user, input indicating positions on a touchscreen display of a user device to be associated with two or more input mechanisms, wherein the input comprises a first touch on the touchscreen display and one or more second touches offset from the first touch;
  defining, in a configuration data, a primary input region based on a first position of the first touch: defining, in the configuration data, one or more secondary input regions arranged radially about the primary input region based at least in part on relative positions of the one or more second touches with respect to the first touch;
  storing, in the configuration data, an association between (a) the primary input region and the one or more secondary input regions, and (b) respective input mechanisms of the two or more input mechanisms;
  determining that the configuration data is to be implemented; and
  upon determining that the configuration data is to be implemented, implementing the configuration data by:
  monitoring touch input on the touchscreen display:
  detecting touch input within the one or more regions: and
  generating activation data for each respective input mechanism of the two or more input mechanisms.

Example B. The method of the preceding example, further comprising providing feedback to the user upon detecting the input within the one or more regions.

Example C. The method of the preceding example, wherein the feedback comprises at least one of a haptic, aural, or visual signal.

Example D. The method of any of the preceding examples, wherein the configuration data is determined to be implemented based at least in part on at least one of a software application that is executed, an identity of the user, or a character being played in the software application.

Example E. The method of any of the preceding examples, wherein the configuration data comprises multiple separate regions associated with a single input mechanism of the one or more input mechanisms.

Example F. The method of any of the preceding examples, wherein the one or more secondary input regions overlap with the primary input region or with an additional secondary input region.

Example G. The method any of the preceding examples, wherein upon detecting that the touch input is located within the overlap, activation data for each of the at least two of the input mechanisms are generated.

Example H. The method of any of the preceding examples, wherein the input received from the user comprises a touch by the user to the touchscreen display while grasping the user device using a natural grasp.

Example I. The method of any of the preceding examples, wherein the input received from the user comprises an indication of the user dragging and dropping one or more input mechanisms to the respective one or more positions on the touchscreen display.

Example J. A user device comprising:
a processor: and
a memory containing instructions that, when executed with the processor, cause the user device to, at least:
receive, from a user of the user device, input indicating two or more positions on a touchscreen display to be associated with two or more input mechanisms wherein the input comprises a first touch on the touchscreen display and one or more second touches offset from the first touch;
define, in a configuration data, a primary input region based on a first position of the first touch;
define, in the configuration data, one or more secondary input regions arranged radially about the primary input region based at least in part on relative positions of the one or more second touches with respect to the first touch;
store, in the configuration data, an association between (a) the primary and secondary input regions and, (b) a respective primary input mechanism and one or more respective secondary input mechanisms of the two or more input mechanisms;
determine that the configuration data is to be implemented; and
upon determining that the configuration data is to be implemented, implement the configuration data by:
monitoring touch input on the touchscreen display;
detecting touch input within the one or more regions; and
generating activation data for each respective input mechanism of the one or more input mechanisms.

Example K. The user device of any of the preceding examples, wherein the user device is configured to communicate with a gaming console, and wherein the activation data is transmitted to the gaming console.

Example L. The user device of any of the preceding examples, wherein the instructions further cause the user device to store the touch input as usage data, and wherein the configuration data is updated based on the usage data.

Example M. The user device of any of the preceding examples, wherein updating the configuration data comprises generating a distribution data based on the usage data and updating the one or more positions associated with the input mechanisms based on the distribution data, and the distribution data generated by iteratively sampling touch input from the user of the user device.

Example N. The user device of any of the preceding examples, wherein updating the one or more positions associated with the input mechanisms comprises updating a first location of the primary input region to be centered on the generated distribution data and updating at least one second location of the secondary input region.

Example O. The user device of any of the preceding examples, wherein at least one of a size or shape of the one or more secondary regions is updated based on the distribution data.

Example P. The user device of any of the preceding examples, wherein the configuration data is updated if a distance between the one or more positions and a center of the distribution data is greater than a threshold distance.

Example Q. The user device of any of the preceding examples, wherein the instructions further cause the user device to detect, based on a movement associated with the touch data, that the touch input comprises a swipe operation.

Example R. A non-transitory computer-readable media collectively storing computer-executable instructions that upon execution cause one or more computing devices to collectively perform acts comprising:
receiving, from a user, input indicating two or more positions on a touchscreen display to be associated with two or more input mechanisms:
defining two or more input regions based on the input, the two or more input regions comprising at least a primary input region based on a first position of the first touch and one or more secondary input regions arranged radially about the primary input region based on a second position of the second touch;
storing, in a configuration data, a respective association between each one of the two or more regions and a respective input mechanism of the two or more input mechanisms;
determining that the configuration data is to be implemented; and
upon determining that the configuration data is to be implemented, implementing the configuration data by:
monitoring touch input on the touchscreen display:
detecting touch input within the one or more regions; and
generating activation data for each respective input mechanism of the one or more input mechanisms.

Example S. The non-transitory computer-readable media of any of the preceding examples, wherein determining that the configuration data is to be implemented comprises receiving a request to implement the configuration data via an application programming interface by a software application executed on a user device.

Example T. The non-transitory computer-readable media of any of the preceding examples, wherein the configuration data is implemented via a graphical overlay presented over the software application executed on the user device.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims in the set of claims.

The invention claimed is:
1. A method for simulating: a physical controller, the method comprising:
receiving, touch input at different positions on a touchscreen of a user device, wherein the touch input com- prises a first touch at a first position and at least a second touch at a second position offset from the first position;

determining which configuration of a plurality of different configurations is to be implemented on the touchscreen, each of the different configurations defining: an arrangement of input regions within the touchscreen and mapped to a respective set of input mechanisms, wherein a plurality of the input regions correspond to a same input mechanism;

determining that the first position and the second position of the touch input are located within one or more of the input regions of the arrangement defined by the determined configuration; and generating activation data based on input mechanisms mapped to the input regions where the first position and the second position are located.

2. The method of claim 1, further comprising generating feedback associated with activation of the two or more input mechanisms mapped to the input regions.

3. The method of claim 1, wherein determining the configuration is based at least in part on at least one of a software application that is executed, an identity of the user, or a character being played in the software application.

4. The method of claim 1, wherein the arrangement defined by the determined configuration includes multiple separate input regions mapped to a same input mechanism.

5. The method of claim 1, wherein the input regions defined by the determined configuration includes a primary input region and one or more secondary input regions that overlap with the primary input region or with another one of the secondary input regions.

6. The method of claim 5, wherein the first position or the second position of the touch input is located within the overlap, and wherein the activation data is generated based on the overlap.

7. The method of claim 1, wherein the arrangement of the input regions correspond to a natural grasp of a user, and further comprising calibrating the determined configuration for the user by modifying one or more of position, size, and spread of the input regions.

8. The method of claim 1, further comprising mapping the determined configuration based on input that includes an indication dragging and dropping one or more of the input mechanisms to the one or more input regions within the touchscreen.

9. A user device for simulating a physical controller, the user device comprising:

a touchscreen that receives touch input at different positions, wherein the touch input comprises a first touch at a first position and at least a second touch at a second position offset from the first position; and a processor that executes instructions stored in memory, wherein the processor executes the instructions to:

determine which configuration of a plurality of different configurations is to be implemented on the touchscreen, each of the different configurations defining: an arrangement of one or more input regions within the touchscreen, each input region mapped to a respective set of input mechanisms, wherein a plurality of the input regions correspond to a same input mechanism;

determine that the first position and the second position of the touch input are located within the one or more input regions of the arrangement defined by the determined configuration; and generate activation data based on input mechanisms mapped to the input regions where the first position and the second position are located.

10. The user device of claim 9, further comprising: a communication interface that transmits the activation data over a communication network to a gaming console.

11. The user device of claim 9, further comprising memory that stores usage data corresponding to the touch input, wherein the determined configuration is updated based on the usage data.

12. The user device of claim 11, wherein the processor executes further instructions to generate distribution data based on the usage data by iteratively sampling touch input from the user of the user device, and to update the input regions based on the distribution data.

13. The user device of claim 12, wherein the processor updates the input regions by centering a primary input region based on the generated distribution data and updating a location of a secondary input region.

14. The user device of claim 13, wherein at least one of a size or shape of the secondary region is updated based on the distribution data.

15. The user device of claim 12, wherein the processor executes further instructions to update the determined configuration based on identifying that a distance between one or more of the first and second positions and a center of the distribution data is greater than a threshold distance.

16. The user device of claim 9, wherein the processor executes further instructions to detect that the touch input includes a swipe gesture based on a movement associated with the touch input.

17. A non-transitory computer-readable storage media storing instructions executable one or more computing devices to perform a method for simulating: a physical controller, the method comprising:

receiving, touch input at different positions on a touchscreen, wherein the touch input includes a first touch at a first position and at least a second touch at a second position offset from the first position;

determining which configuration of a plurality of different configurations is to be implemented on the touchscreen, each of the different configurations defining: an arrangement of one or more input regions within the touchscreen, each input region mapped to a respective set of input mechanisms, wherein a plurality of the input regions correspond to a same input mechanism;

determining that the:

first position and the second position of the touch input are located within the one or more input regions of the arrangement defined by the determined configuration; and generating activation databased on input mechanisms mapped to the input regions where the first position and the second position are located.

18. The non-transitory computer-readable media of claim 17, wherein determining the configuration to be implemented on the touchscreen is based on a request received via an application programming interface of a software application executed on a user device.

19. The non-transitory computer-readable media of claim 18, wherein the determined configuration defines the arrangement of input regions within a graphical overlay presented on the touchscreen.

20. The method of claim 1, wherein at least one of the plurality of the input regions is responsive to a plurality of touch input types.

* * * * *